US011305307B2

(12) United States Patent
Batts

(10) Patent No.: US 11,305,307 B2
(45) Date of Patent: Apr. 19, 2022

(54) TACTICAL TURBINE AEROSOL GENERATOR

(71) Applicant: Felix M. Batts, Raleigh, NC (US)

(72) Inventor: Felix M. Batts, Raleigh, NC (US)

( * ) Notice: Subject to any disclaimer, the term of this patent is extended or adjusted under 35 U.S.C. 154(b) by 76 days.

(21) Appl. No.: 16/891,674

(22) Filed: Jun. 3, 2020

(65) Prior Publication Data
US 2020/0391237 A1 Dec. 17, 2020

Related U.S. Application Data

(60) Provisional application No. 62/856,678, filed on Jun. 3, 2019.

(51) Int. Cl.
*B05B 11/00* (2006.01)
*F02C 7/266* (2006.01)

(52) U.S. Cl.
CPC ...... *B05B 11/0002* (2013.01); *B05B 11/0037* (2013.01); *F02C 7/266* (2013.01); *B05B 11/30* (2013.01)

(58) Field of Classification Search
CPC . B05B 11/0002; B05B 11/0037; B05B 11/30; B05B 7/2472; B05B 7/2475; B05B 7/1686; B05B 7/0075; F02C 7/266; F02C 6/18; F02C 6/04; F05D 2250/82; F22B 27/16; F24B 12/48; F41H 9/06; A01M 13/00; A01M 29/12
USPC ........ 126/401, 405, 406, 407, 408; 102/329, 102/334, 364, 370, 513; 43/127, 129; 239/136, 133, 14.1
See application file for complete search history.

(56) References Cited

U.S. PATENT DOCUMENTS

| 2,836,567 | A | | 5/1958 | Reure et al. |
| 4,484,195 | A | | 11/1984 | Shaffer |
| 4,811,901 | A | * | 3/1989 | Stevens .............. A01M 13/00 239/129 |
| 4,998,479 | A | | 3/1991 | Perham et al. |
| 5,115,633 | A | | 5/1992 | Priser et al. |
| H1124 | H | | 1/1993 | Rouse et al. |

(Continued)

FOREIGN PATENT DOCUMENTS

WO 9209544 A1 6/1992

*Primary Examiner* — Vishal Pancholi
(74) *Attorney, Agent, or Firm* — Law Firm of Andrea Hence Evans; Andrea H. Evans

(57) ABSTRACT

Disclosed herein is a tactical turbine aerosol generator. An embodiment of tactical turbine aerosol generator can comprise an aerosol dispersal system. The aerosol dispersal system can include an aerosol generator. The aerosol generator can comprise a solution tank assembly. The solution tank assembly can be configured to transport an aerosol solution for vaporization. The aerosol generator can further include a motor device. The motor device can be configured to vaporize the aerosol solution and expel the aerosol solution from the aerosol generator. Aerosol generator can also comprise an engine control unit in electrical communication with the motor device. The aerosol generator can include a transmitter assembly in electrical communication with the solution assembly and engine control unit. The aerosol generator can also be configured actuate operation of the aerosol generator. The aerosol dispersal system can also include an auxiliary container assembly configured to be coupled to the aerosol generator.

17 Claims, 9 Drawing Sheets

(56) References Cited

U.S. PATENT DOCUMENTS

| | | | |
|---|---|---|---|
| 5,937,141 A | 8/1999 | Swiatosz | |
| 2009/0298935 A1* | 12/2009 | Flanigan | A61L 9/03 |
| | | | 514/529 |
| 2011/0103778 A1* | 5/2011 | Batts | F22B 27/16 |
| | | | 392/405 |
| 2015/0226530 A1 | 8/2015 | Batts | |
| 2015/0321970 A1* | 11/2015 | Vandoninck | B05B 9/002 |
| | | | 102/530 |
| 2016/0370151 A1* | 12/2016 | Batts Ph.D | A63J 5/025 |

* cited by examiner

TACTICAL TURBINE AEROSOL GENERATOR

RELATED APPLICATIONS

This application claim priority to U.S. Provisional Patent Application No. 62/856,678, filed on Jun. 3, 2019, the contents of which is incorporated herein by reference in its entirety.

FIELD OF DISCLOSURE

The present disclosure relates aerosol generation and, in particular a device and system configured to produce simulated smoke (aerosols) for industrial uses.

BACKGROUND

The generation of synthetic smoke has multiple applications in commercial and tactical control environments. For example, generated smoke can be use in training exercises, crowd dispersal or special effects. Currently, the operational capacity of smoke generating devices is limited with respect to the overall volume of smoke or the continuous output of smoke. Accordingly, there remains a need for improved comprehensive and efficient way to address the problem of producing a large continuous volumes of smoke. This need and other needs are satisfied by the various aspects of the present disclosure.

SUMMARY

Some or all of the above needs and/or problems may be addressed by certain embodiments of the disclosure. In accordance with the purposes of the disclosure, as embodied and broadly described herein, the disclosure, in one aspect, relates to an aerosol generator. An embodiment of the aerosol generator can include a solution tank assembly. The solution tank assembly is configured to transport an aerosol solution. The aerosol generator can include a motor device wherein the motor device is configured to vaporize the aerosol solution. The motor device can also expel the aerosol solution from the aerosol generator. The aerosol generator can comprise an engine control unit in electrical communication with the motor device. The aerosol generator can also include a transmitter assembly in electrical communication with the solution tank assembly and engine control unit and configured actuate operation of the aerosol generator.

In another embodiment of the disclosure comprises an aerosol dispersal system. The aerosol dispersal system can include an aerosol generator. The aerosol generator can comprise a solution tank assembly. The solution tank assembly can be configured to transport an aerosol solution for vaporization. The aerosol generator can further include a motor device. The motor device can be configured to vaporize the aerosol solution and expel the aerosol solution from the aerosol generator. Aerosol generator can also comprise an engine control unit in electrical communication with the motor device. The aerosol generator can include a transmitter assembly in electrical communication with the solution assembly and engine control unit. The aerosol generator can also be configured actuate operation of the aerosol generator. The aerosol dispersal system can also include an auxiliary container assembly configured to be coupled to the aerosol generator.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several aspects of the disclosure and together with the description, serve to explain the principles of the disclosure.

DETAILED DESCRIPTION

Figure 1:
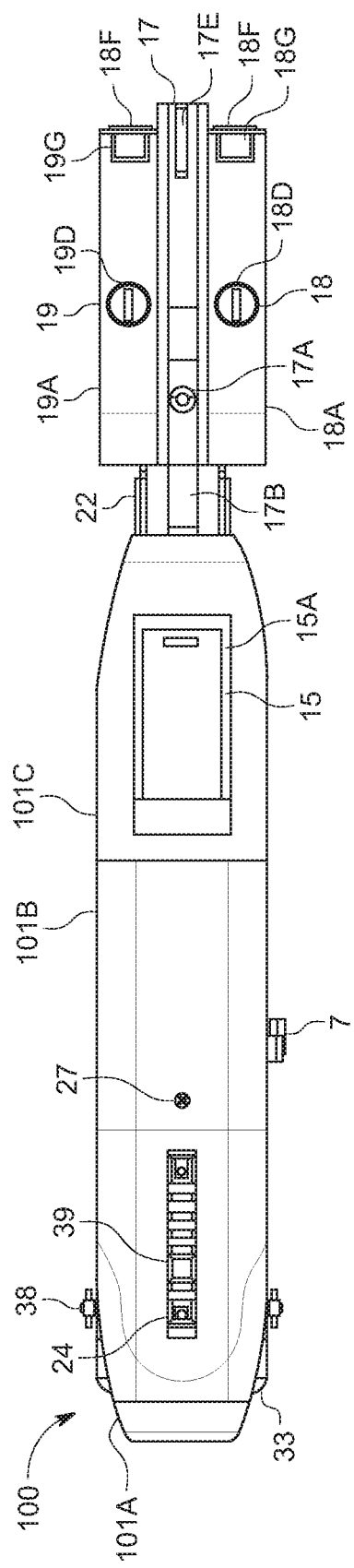
FIG. 1 depicts a top view of the aerosol generator.

The present disclosure can be understood more readily by reference to the following detailed description of the disclosure and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods, and materials are now described.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

DETAILED DESCRIPTION

As briefly described above, the present disclosure relates, in various aspects, to a tactical turbine aerosol generator. The aerosol generator can be a modular-compact-hand-held-aerosol-generator. In one aspect, the aerosol generator can be driven by a tether-control-system (remote-control). The aerosol generator can comprise a tubular housing. Further, the aerosol generator can be powered by both an internal combustion system and an electrical battery. The aerosol (smoke) generated by the aerosol generator 100 can be provided by peripheral tanks coupled to the tubular housing. In another aspect, additional aerosol solution or fuel can be provided to the aerosol generator by an auxiliary container system that couples to the aerosol generator. The aerosol solution can be a liquid that is formulated to produce a gas with particulates when sufficient heated. The vaporized aerosol solution can yield smoke, gaseous pesticides, or the like. In operating the aerosol generator, aerosol solution is pumped from peripheral tanks or auxiliary system at one end of the tubular housing. The aerosol solution is vaporized and emitted when the solution comes in proximity to an internal combustion turbine. The heat from the turbine vaporizes the aerosol solution. In addition, the rotary motion of the turbine produces an air force that expels the vaporized solution away from the tubular housing, as the vaporized solution exits nozzles located at the opposite end of the tubular housing.

Figure 2:
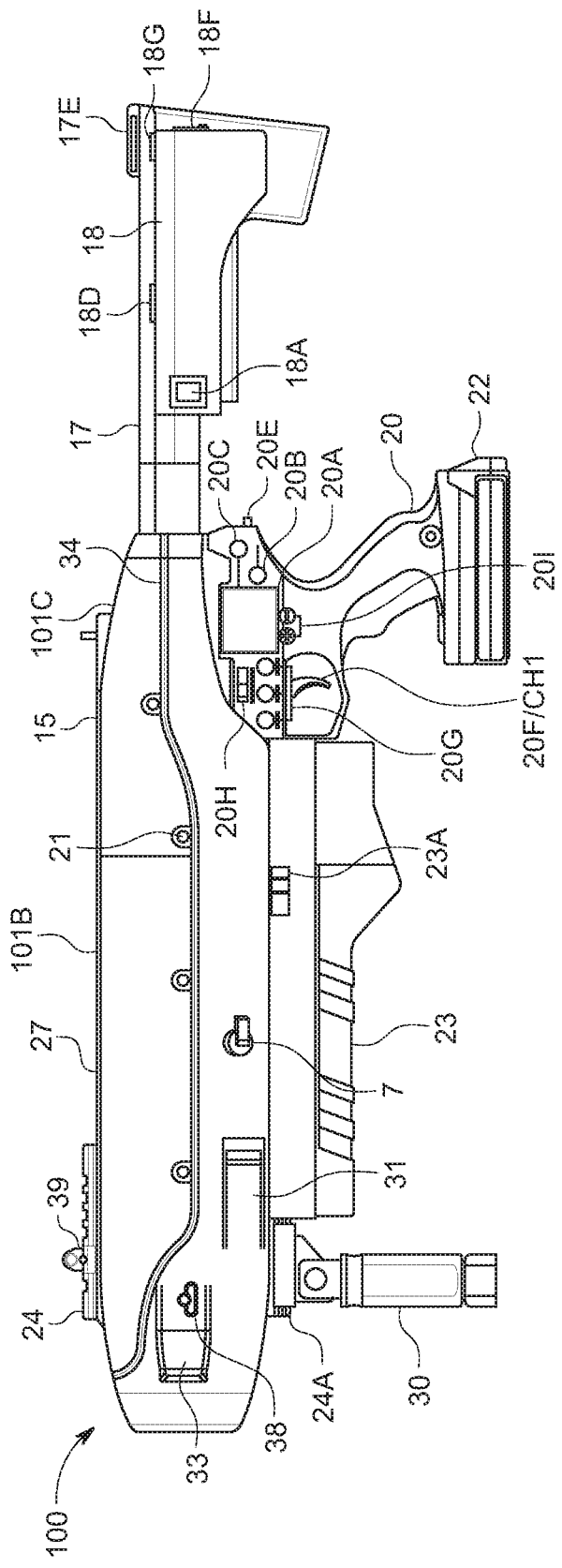
FIG. 2 depicts side view of the aerosol generator.

As shown in FIGS. 1 and 2, the aerosol generator 100 can comprise an external housing 101. The external housing 101 can comprise a tubular shape, while other geometric configurations are considered. In a further aspect, the external housing can be partitioned in to panels. As shown in FIGS. 1 and 2, the housing 101 can comprise three panels 101A, 101B, and 101C. The panels can be coupled together for form a unitary housing 101. The panels can be held in place by a plurality of D rings 21. Additional types of fasteners 25, 35 other than D-rings can be used as well. The portioned configuration for the housing panel can allow for easier maintenance, reconfiguration, or swapping of internal components. In yet another aspect, the housing 101 can include one or more orifices 27 that allows wires to pass through the housing 101. These wires can be connected to various internal components of the aerosol generator 100. The housing can also include a thermal coating 36 as a safety measure from heat in proximity to the nozzle 2.

The external structure of the external housing can include external fixtures 24, 24A, such as latches, hooks, or rails. These external fixtures 24, 24A allow for peripheral items to be affixed to the external housing 101 and provide additional functionality for the user. For example a night scope, infrared scope, or additional lighting can be affixed to the housing 101. The external housing 101 can further include strap connection fixtures 38, 39. The strap connection fixtures can be mountings structured to allow a carrying strap to be connected to the housing 101. An external strap (not shown) can allow the user additional comfort when the strap is placed on the shoulders to distribute the weight of the entire aerosol generator 100. In yet another aspect, the housing 101 can also include a flashlight 33. The flashlight 33 can be a high-intensity flashlight with selectable capabilities for both general use and tactical capabilities. The housing 101 can also include an LED light strip 34. The LED light strip can be multiple colors to provide lighting applications or aesthetics for the housing 101. The light strip 34 can provide a visual indicator as to the system mode for the aerosol generator 100. For example, a particular color can be associated with the amount or speed at which aerosol is produced.

The external surface of the housing can further include a visual display 15. The visual display 15 can serve as a graphical user interface (GUI) to make selections for the operation of the aerosol generator 100. In a further aspect, the display can be protected from damage using a cover 15A made of a durable material such as rubber or silicone. Further, the cover 15A can be further secured to the housing 101 by the using of a framing cover magnet 15B and frame magnet 15C, See FIG. 4. The magnet configuration can allow the user to quickly access the GUI while still maintain suitable protection for the GUI in the display 15.

The external housing 101 can also include certain safety features that maintain and protect the operation of the aerosol generator 100. The housing can define additional orifices that can be used to maintain the temperature of the aerosol generator 101. For example, an air channel 31 can be located in proximity to the internal combustion turbine, not shown. The air channel 31 proximity of the turbine fuel to the natural grip of the user provides additional comfort by reducing the possibility of overheating. For additional means to increase user comfort, a tactile grip 30 can be used. The housing can also comprise the fuel tank 23 for a turbine (not shown). The fuel tank 23 can be disengaged from the housing 101 by actuating the release latch 23A.

Figure 3:
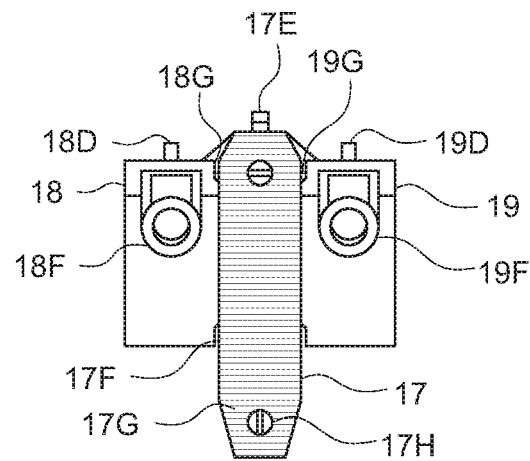
FIG. 3 depicts a rear view of the aerosol generator.

The aerosol generator can further comprise a solution tank assembly 17. The tank assembly can include at least two tanks 18, 19 configured to hold aerosol solution. The peripheral tanks 18, 19 can be coupled to the rear of the housing 101 using fasteners 17A, 18A, and 19A. In a further aspect, these fasteners can be D-rings, screws or bolts. In the current embodiment, the D-rings allow for quicker transition in removing the tanks 18 and 19 from the housing 101. In addition to fasteners, the external surface of the solution tank assembly 17 can include, a dual pump access door 17B and a sling harness fixture 17E. Similar to the fixtures 38 on the tubular housing 101, the sling harness fixture 17E is an additional fixture that can be used as a connection point for a carrying strap or harness. The internal cavity of the peripheral tanks 18, 19 can be accessed by removing the container caps 18D and 19D. In the event that the auxiliary container assembly (backpack) 200 (not shown) is used, the user can connect hoses from the auxiliary container assembly 200 to the couplings 18F, 19F located at the rear of the peripheral tanks 18, 19. As shown in FIGS. 1-3, the solution tank assembly 17 can also include additional latch mechanisms 18A, 19A, 18G and 19G to release the peripheral solution tanks 18, 19 (and associated tubing-not shown) from the solution tank assembly 17. Also shown in FIG. 3, the solution tank assembly 17 can include guide rails 17F for coupling of additional peripheral devices; a butt plate 17G to provide additional comfort to the user; and an associated fastener 17H for the butt plate.

Figure 4:
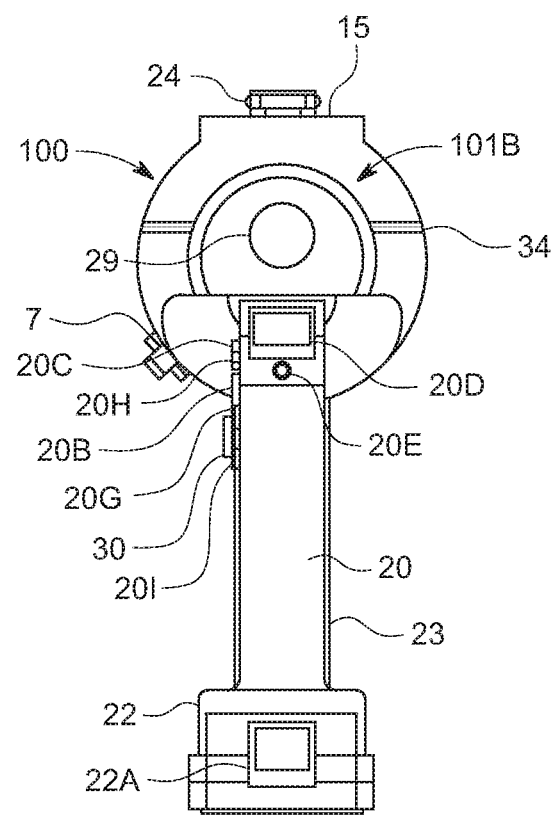
FIG. 4 depicts a rear view of the aerosol generator wherein the solution tank assembly is removed.

As shown in FIG. 2 and FIG. 4, the aerosol generator 100 can include a transmitter assembly. The transmitter assembly 20 can serve as the external actuation for the aerosol generator 100. Similar to the display/GUI 15, the transmitter assembly can include and auxiliary display 20A. The auxiliary display 20A can provide limited functionality and display capabilities compared to the display/GUI 15. In another embodiment, the auxiliary display 20A can provide additional information that is not displayed on the display/GUI 15. The operation of the auxiliary display 20A can be manipulated by select buttons 201. In a further aspect, the aerosol generator 100 can be customized to define which information is presented on the display/GUI 15 and the auxiliary display 20A. In another aspect, the operation of the aerosol generator 100 can be modified by actuating the mode buttons 20B adjacent to the auxiliary display 20A. The triggering assembly 20 also includes auxiliary channels 20G. The auxiliary channels 20G can include ports to allow inputs for additional peripheral devices. For example, the peripheral devices could include additional lights or a camera. The trigger assembly 20 can include a tank-valve switch 20H, the tank valve switch can be used to toggle between a single or multiple peripheral tanks 18, 19 used.

The user can actuate the power for the aerosol generator 100 by pressing the power button 20C. One of the power sources provided to the aerosol generator can comprise a battery 22. The battery 22 can be a 40V battery configured to supply power to all of the electrical components of the aerosol generator 100. The battery 22 can connected and disconnected by actuating the battery quick release button 22A. Once the aerosol generator is powered, a user can expel aerosol from the housing 101 by squeezing the trigger. In a further aspect, the triggering mechanism can be configured to adjust the flowrate of the aerosol expelled based on the amount of pressure (throttling) applied to the trigger 20F.

The transmitter assembly 20 adds the functionality of allowing the aerosol generator 100 to be controlled remotely. In one aspect, when the transmitter quick latch 20D is placed in the tether mode, the aerosol generator 100 can receive signals from the antennae 20E facilitating remote control from an external source. The remote capability allows the aerosol generator 100 to be coupled to other mechanisms that do not require human use. For example, the aerosol generator can be coupled to an unmanned air vehicle (UAV). With these remote capabilities, tactical or commercial uses can implemented by a remote user. With regards to tactical capabilities solutions, crowd dispersal could be implemented when the aerosol generator produces smoke while coupled to a drone. Commercial or industrial remote operations could include aerial crop fertilization using a drone as well. Further, while these remote operations are being performed by aerosol generator, the transmitter's assembly can transmit and receive data to maintain or adjust the operation of the aerosol generator 100.

Figure 5:
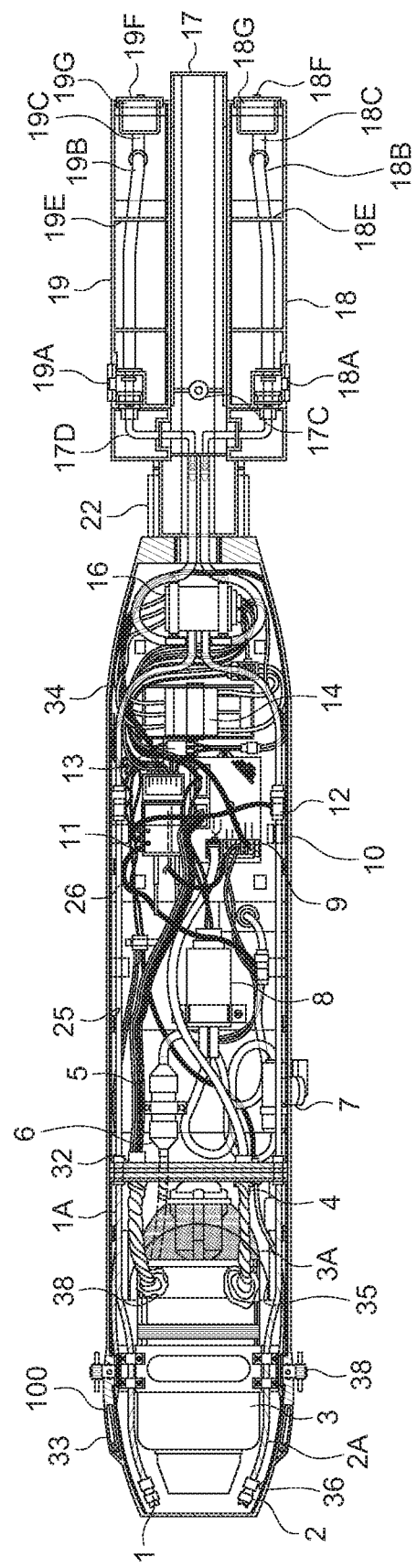
FIG. 5 depicts a top cross-sectional view of the aerosol generator.
Figure 6:
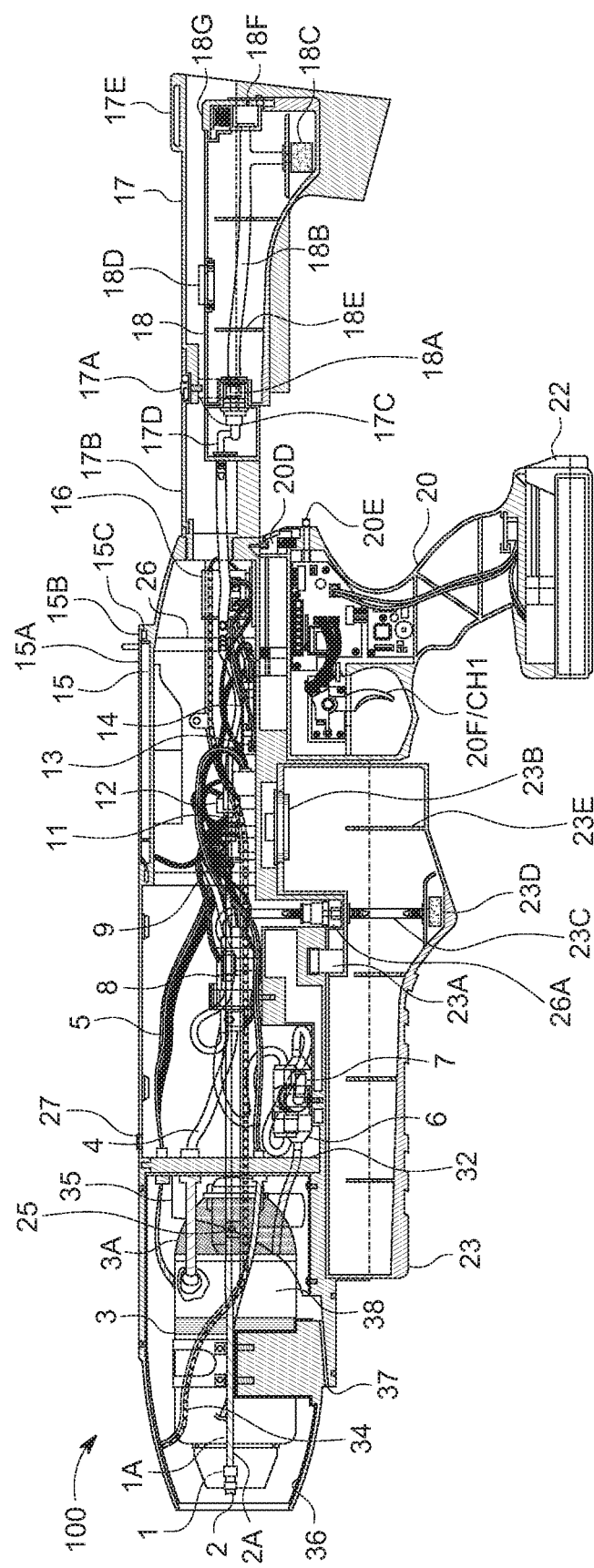
FIG. 6 depicts a side cross-sectional view of the aerosol generator.
Figure 7:
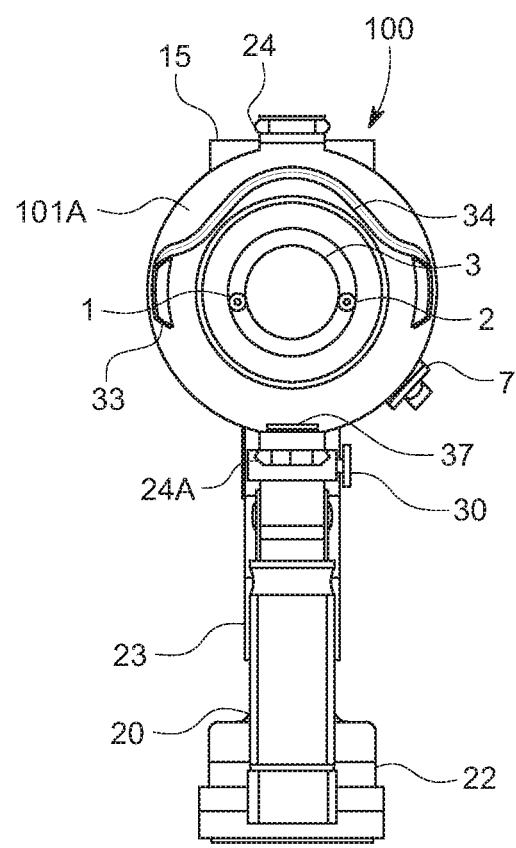
FIG. 7 depicts a front view of the aerosol generator.

FIGS. 5 and 6 depict cross-sectional views of the aerosol generator 100. FIG. 7 depicts a front view of the aerosol generator. As discussed earlier, aerosol solution flow can initiate in the peripheral tanks 18, 19. The aerosol solution can be pumped by in to the solution pickup 18C. The solution pickup 18C can be the opening of a solution feed line 18B. In another aspect, the peripheral tank 18 can include a baffle 18E. The baffle 18E can be used to reduce the fluid motion of the aerosol solution. The baffle can comprise walls that are oriented in the internal cavity of the peripheral tanks 18, 19. The solution feed line 18b traverses peripheral tank 18 and enters connection pipes 17D, passing through stock port 29, connecting to the dual pump valve 16 at connector 17C. The dual pump valve 16 pumps the aerosol solution through the solution lines 1A and 2A. In one aspect, the solution lines 1A, 2A can be coupled to fluid gage 12. The fluid gage 12 can measure with flow-meters the levels of the aerosol solution. The fluid gage 12 can provide data to the remote control integrated telemetry receiver 11. After exiting, the fluid gages, the solution lines 1A, 2A can terminate at the spray nozzles 1, 2.

The aerosol generator 100 can further include an internal combustion motor device 3. In one aspect the motor device can be a turbine 3. The turbine 103 can produce heat to vaporize the aerosol solution and provide a propelling force expel the vapor from the aerosol generator 100. In particular, the valve pump 16 pushes the aerosol solution through the solution lines 1A, 2A. While in proximity to the turbine 103, the heat generated by the turbine 3 can vaporize the aerosol solution in the solution lines 1, 2. The turbine can also include a drain pan 37 to catch overflow fuel powering the turbine. In an alternative embodiment, the turbine can be configured to be a hybrid-powered turbine engine. The hybrid-powered turbine engine can be powered by both combustible fuel and/or electricity. For example, when the aerosol generator 100 is powered but idling (trigger is not being squeezed), the turbine can operate off of electrical power. When a higher rating of power is warranted the engine control unit 9 can switch the turbine 3 to operating as an internal combustion engine, using the combustible fuel.

The fuel for the turbine 3 can be provided by the fuel tank 23. In a further aspect the fuel tank 23 can include baffles 23E. Similar to the baffles 18E in the peripheral tank, the baffles 23e in the fuel tank can regulate the fuel flow into the tank. Access to the fuel tank can be provided by an orifice in the fuel tank that can be covered by a fuel tank cap 23B. In providing fuel to the turbine, fuel can be drawn into the fuel pickup 23D. The fuel pickup 23D can be a terminal end in a fuel line 23C that also comprises a filter. The fuel can be pumped to the turbine 3 via a fuel pump 8. In a further aspect, the fuel provided to the turbine 3 can pass through a fuel filter. The fuel filter 6 can be a screen that remove foreign object debris (FOD) from the fuel.

As an additional safety mechanism, aerosol generator can include a safety petcock 7. The safety petcock 7 can be a valve that is accessible from the external housing 101. To reduce or eliminate fuel flow to the turbine 3, the safety petcock can be manually manipulated to shutoff fuel flow as a safety precaution. In a further aspect, the aerosol generator 100 can include a FOD screen 3A. FOD screen 3A can be used to reduce debris that may have entered the internal cavity of the external housing 101 via the air channel 31. In another aspect, the internal cavity of the external housing can include a firewall 32. The firewall 32 can be a material placed between the turbine 3 and electrical components. The firewall 32 can also safeguard low pressure airflow of the turbine 3.

In addition to the internal combustion components of the turbine system 3, can also include electrical components to initiate combustion and regulate continual application. In a further aspect, the turbine can include a starter cable 5. In one aspect, the starter cable provide an initial electrical spark to initiate the combustion within the turbine. The electrical spark can be supplied by the battery 22. In a further aspect, the turbine 3 can include an engine control unit (ECU) 9. The ECU can function as a control the electrical components of the system. For example, the turbine 3 can be in electrical communication via a data cable 4 to supply electrical information from the ECU. The ECU 9 can be coupled electronically to the receiver 11. In a further aspect, data received by the receiver 11 can be communicated and processed by the ECU. In a further aspect, the ECU 9 can provide responsive output to the other system components of the aerosol generator 100 via the receiver 11. The ECU 9 could also be in electrical communication with a battery elimination circuit BEC 13. The BEC 13 can regulate powering of the receiver and valve pump 16. In a further aspect, the BEC can operate in conjunction with the ECU to regulate the power requirements and functional operation of the other electrical components of the aerosol generator 100. In a further aspect, the electrical components can include and electronic speed-controller (ESC) (14). The ESC 14 can work in tandem with the BEC to provide power and speed control to the dual pump valve.

Figure 8:
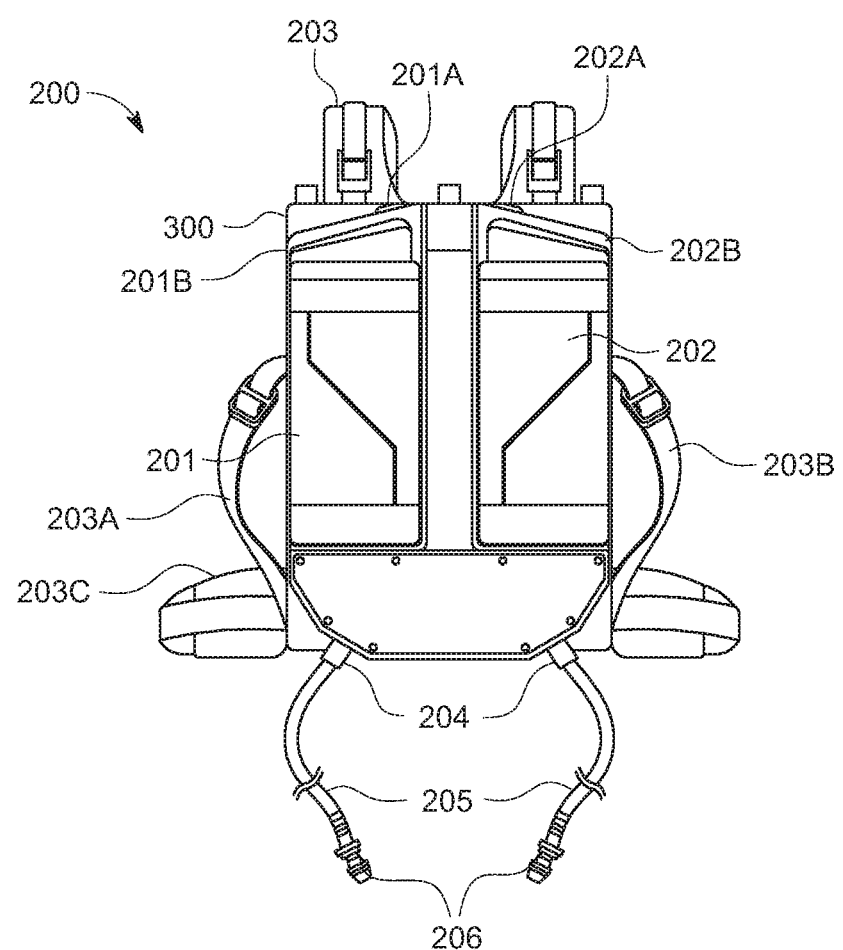
FIG. 8 depicts a front view of the auxiliary container system.
Figure 9:
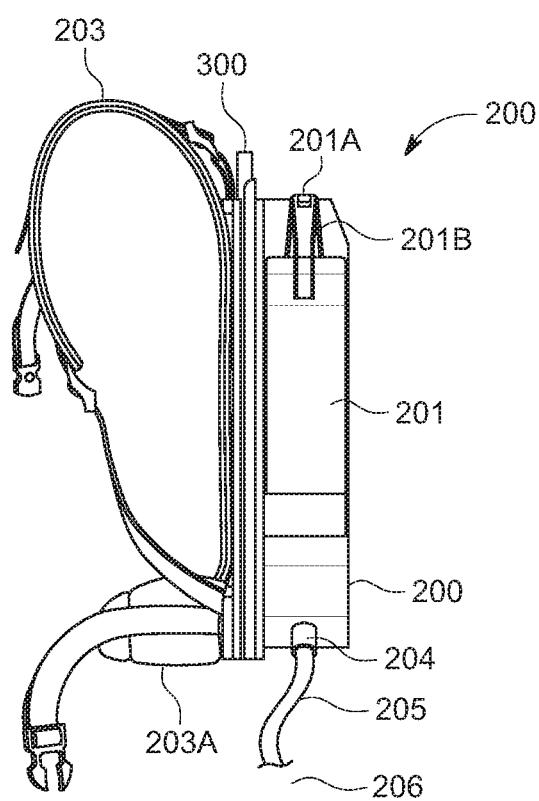
FIG. 9. depicts a side view of the auxiliary container system.

FIG. 8 and FIG. 9 depict a front view and a side view of an auxiliary container system 200. The auxiliary container system 200 can be used to increase the amount of aerosol solution and or motor fuel accessible to the user during using. The auxiliary container system 200 can also provide ease of transport for the solution and fuel. In one aspect, the auxiliary container 200 can include a harness 203. The harness 203 can comprise straps 203A, 203B. The straps 203A, 203B can rest on the user's shoulders to evenly distribute the weight of the liquids. In another aspect, the harness 203 can comprise an embodiment with a single harness. In a further aspect, the harness 203 can include hip pads 203C. The hip pads 203C can be used to provide additional comfort and ergonomic support for the user.

The auxiliary container system 200 can include one liquid tank. As shown in FIG. 8, the auxiliary container system 200 can include multiple liquid tanks, an auxiliary fuel tank 201, and an aerosol solution tank 202. In a further aspect, each tank can include a baffle structure (not shown) oriented in the internal cavity of the respective tanks. The baffle structures can be internal walls used to reduce the amount of motion of the fluids in the tank, mitigating the amount of stress placed on the user while carrying the auxiliary container system 200.

In a further aspect, the auxiliary fuel tank 201 can include a latch 201a that allows the user to couple and de-couple the fuel tank from the harness 203. In one aspect, the latch 201a can be configured with a bias mechanism such as a spring to allow the latch to quickly engage or disengage the fuel tank from the harness 203. The auxiliary fuel tank 201 can further include a handle 201b that allows the user to: 1) carry the fuel tank when the auxiliary fuel tank 201 is disconnected from the harness; or 2) as an additional method of transporting the auxiliary container system 200, when the fuel tank is connected to the harness 203. Similarly, the aerosol solution tank 202 can include the sample components as the auxiliary fuel tank 201. In particular, the solution tank can include a latch comprise a latch 202a to couple and decouple the solution tank 202 from the harness 203. In addition, the solution tank 202 can include a handle 202b for carrying the solution tank. In a further aspect, the harness 203 can include a hover glide-mount that functions as a container stabilization device. The hover glide mount 300 can be plurality of springs that are coupled to the harness. The orientation of the springs can be used to counteract the weight or force-moments generated by the liquids in the auxiliary tanks 201 202.

The auxiliary container system 200 can be couple to the aerosol generator 100 by the use of hoses 205A, 205B. The one end of a fuel hose 205A can be coupled to the auxiliary fuel tank 201 by fuel tank coupling 204A and the opposite end can be connected to a fuel tank quick release coupling 206B. Similarly, the one end of a solution hose 205B can be coupled to the solution tank couplings 204B and the opposite end can be connected to a solution tank quick-release coupling 206B. The quick-release couplings for the fuel tank and the solution tank can be used to efficiently engage or disengage the respective tanks from the aerosol generator. For example, the quick-release couplings allow the user to quickly couple the fuel hose 204A or solution hose 204B to the couplings 19F located on the external surface of the solution tank assembly 17. In a further aspect, when the auxiliary container system 200 is coupled to the aerosol generator 100, either of the solution tanks 18-19 can be disengaged from the solution tank assembly 17. The solution tank quick-release coupling 206B can be connected to the quick release couple coupling 18A/19A in the solution tank assembly 17. In another aspect, when coupling the auxiliary fuel tank 201 to the aerosol generator, the fuel tank 23 can be disengaged from the aerosol generator 100. The fuel tank connector 26A can be coupled to the quick release coupling 23A in proximity to the turbine 3 as shown in FIG. 6. In yet a further aspect, the auxiliary container system 200 can be configured to house approximately 3 gallons of liquid for a single tank or between the fuel tank and solution tank.

Figure 10:
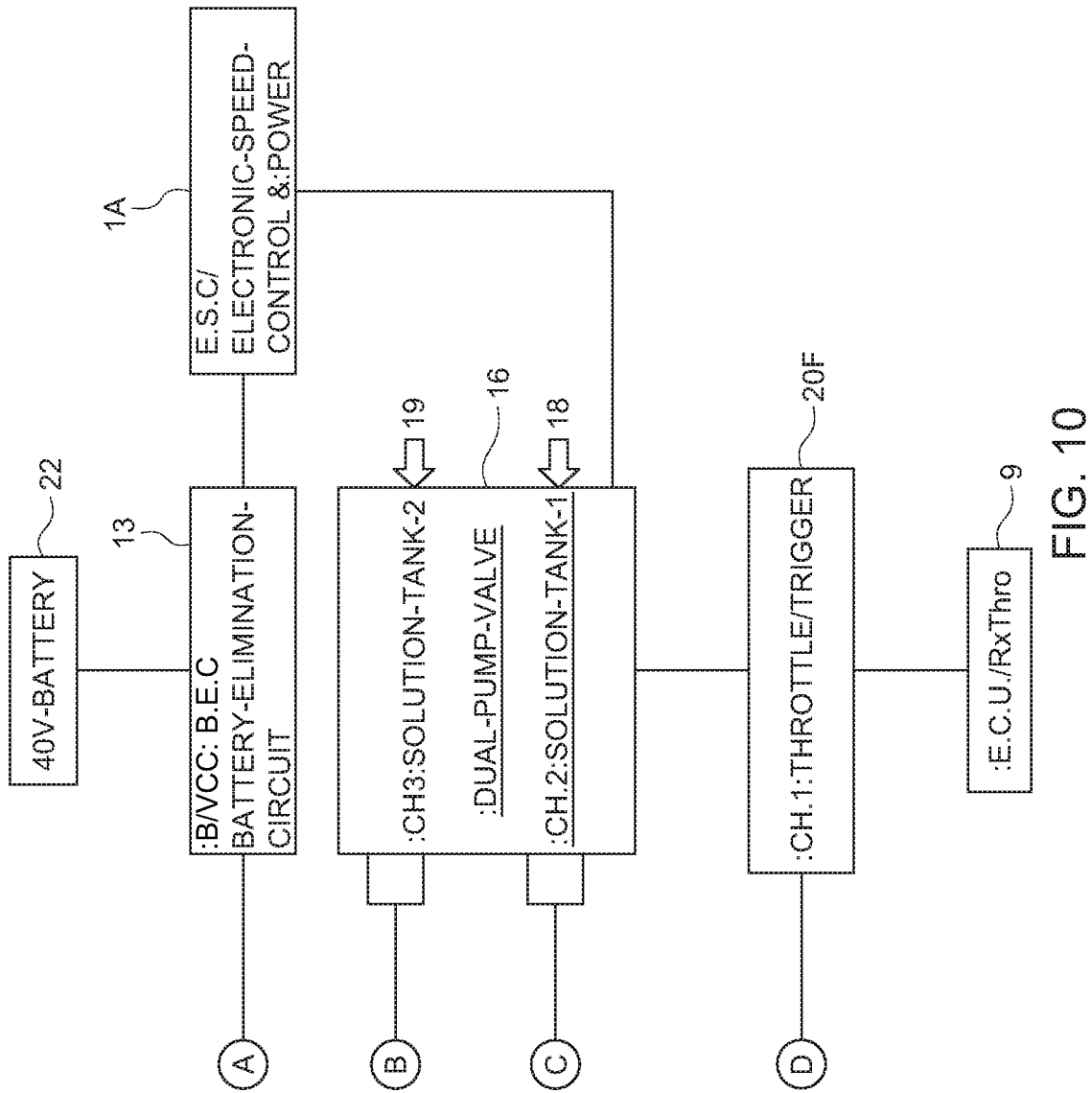
FIG. 10 depicts and electrical schematic of the integrated telemetry receiver.
Figure 10:
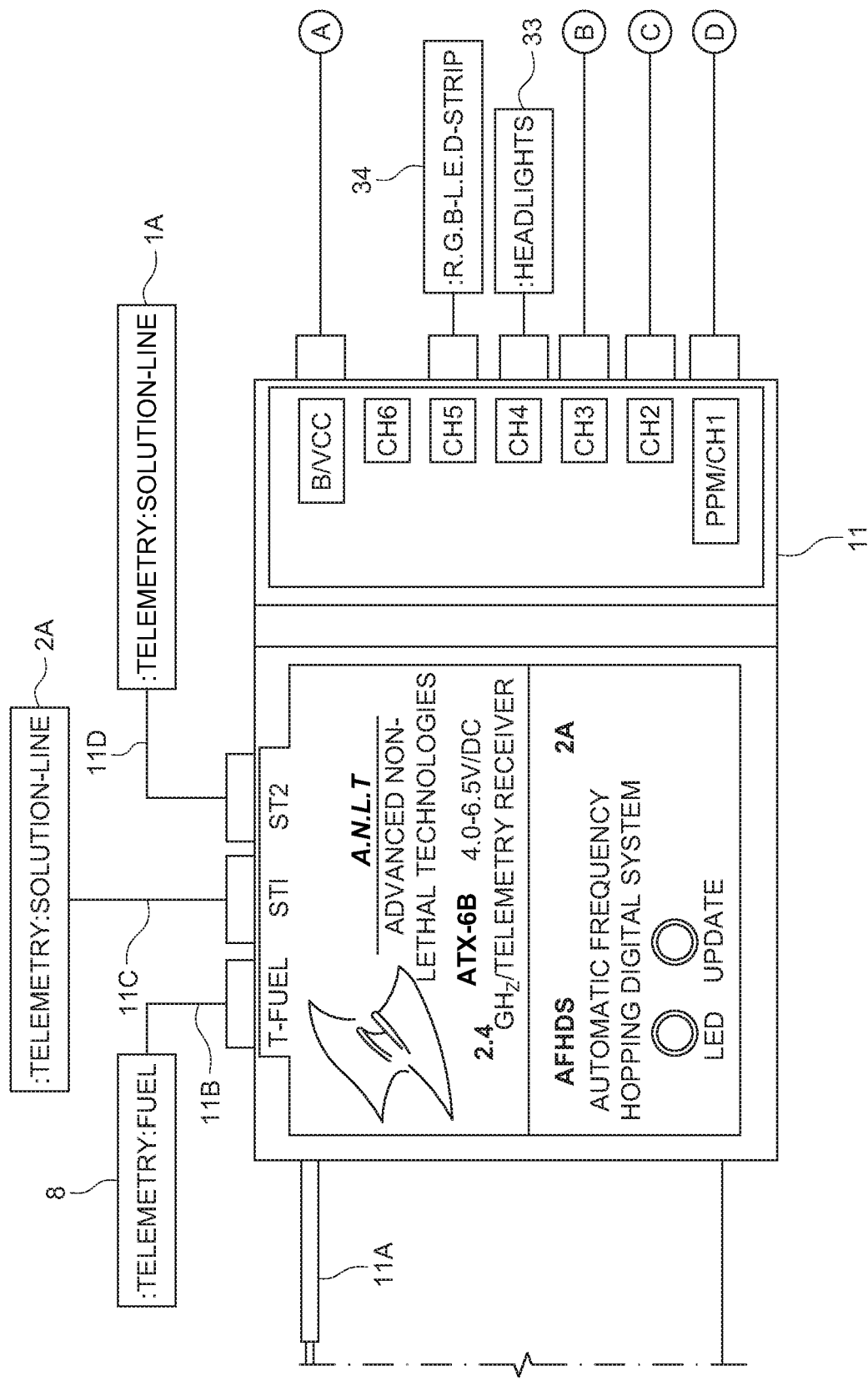

FIG. 10. Depicts an electrical schematic of a telemetry receiver 11. The receiver can serve as the communication bus for the aerosol generator 100 by completing telemetry functions for the aerosol generator 100. For example, the telemetry functions can be completed by sending and receiving a plurality of data from sensors (not shown) located at various components of the aerosol generator. The receiver 11 can be configured to receive and transmit data to the sensors aerosol generator 100 subcomponents components via a retractable antennae 11A. The antennae can be retractable to aid increasing signal strength and while maintain functionality to mitigate damage to the antennae. The antennae 11A can rout control data through the engine control unit (ECU) 9 (not shown) to regulate the functions of the turbine 3. As further shown in FIG. 10, the receiver 11 can include a flow meter 11B that can determine the fuel levels or flow rates from fuel pump 8. The receiver 11 can include solution tank flow meters 11C, 11D to measure the flow aerosol solution flow rates through the nozzles 1A, 2A. In a further aspect, channels of the receiver 11 can be configured to received data form the lighting arrangements on the aerosol generator 100, such as the high lumen flashlights 33 or the Red-Green-Blue (RGB) light emitting diode (LED) strips 34. The receiver 11 can also receive and transmit data from the two solution tanks 18, 19. In addition, data from the fuel pump 6 connected to the aerosol solution tanks 18 and 19 can provided to the receiver 11. Electrical power can also be paired through the receiver 11. For example, data from the battery elimination circuit (B.E.C) 13, electronic speed control 14, the engine control 9 and battery 22 can be electronically coupled to provide necessary data to the receiver for subsequent processing. Further, the operation of the throttle and trigger 20F/CH1 can provide information to the receiver 11.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

What is claimed:

1. An aerosol generator comprising:
   a solution tank assembly wherein the solution tank assembly is configured to transport an aerosol solution;
   a motor device wherein the motor device is configured to vaporize the aerosol solution and expel the aerosol solution from the aerosol generator;
   an engine control unit in electrical communication with the motor device; and
   a transmitter assembly in electrical communication with the solution tank assembly and engine control unit and configured actuate operation of the aerosol generator.

2. The aerosol generator of claim 1, wherein an external housing comprises a plurality of portions, such that the plurality of portions are configured to couple form a unitary external housing.

3. The aerosol generator of claim 1, wherein an external housing further comprises at least one graphical user interface.

4. The aerosol system of claim 1, wherein the motor device is an internal combustion turbine.

5. The aerosol system of claim 1, wherein the transmitter assembly is configured remotely control operation of the aerosol generator.

6. The aerosol generator of claim 1 wherein at least one solution tank comprises a baffle oriented in an internal cavity of the solution tank assembly.

7. The aerosol generator of claim 1, wherein the transmitter assembly comprises an antennae that is retractable.

8. The aerosol generator of claim 1, wherein the motor device further comprises a fuel shutoff valve.

9. An aerosol dispersal system comprising:
   an aerosol generator comprising:
      a solution tank assembly wherein the solution tank assembly is configured to transport an aerosol solution;
      a motor device wherein the motor device is configured to vaporize the aerosol solution and expel the aerosol solution from the aerosol generator;
      an engine control unit in electrical communication with the motor device;
      a transmitter assembly in electrical communication with the solution tank assembly and the engine control unit and configured actuate operation of the aerosol generator; and
   an auxiliary container assembly configured to be coupled to the aerosol generator.

10. The aerosol dispersal system of claim 9, wherein the aerosol generator is encompassed by an external housing.

11. The aerosol dispersal system of claim 10, wherein the external housing device further comprises at least one graphical user interface.

12. The aerosol dispersal system of claim 9, wherein the motor device is an internal combustion turbine.

13. The aerosol dispersal 1 system of claim 9, wherein the transmitter assembly is configured to remotely control operation of the aerosol generator.

14. The aerosol dispersal system of claim 9, wherein the transmitter assembly comprises a throttling device wherein fluid flow from the solution tank assembly is regulated.

15. The aerosol dispersal system of claim 9, wherein the auxiliary container is configured to be worn by a user.

16. The aerosol dispersal system of claim 9, wherein the auxiliary container further comprises a container stabilization device.

17. The aerosol dispersal system of claim 9, wherein the auxiliary container is configured with a plurality of compartments wherein at a first compartment is configured to contain an aerosol solution and a second compartment is configured to contain turbine fuel.

* * * * *